United States Patent
Baudin et al.

(10) Patent No.: US 12,073,730 B2
(45) Date of Patent: Aug. 27, 2024

(54) SUPPORTING AN AIRCRAFT IN A REDUCED-ENGINE TAXI OPERATION

(71) Applicant: THE BOEING COMPANY, Chicago, IL (US)

(72) Inventors: Martin Baudin, Wiesbaden (DE); Marco Gaertner, Sinntal-Sannerz (DE)

(73) Assignee: The Boeing Company, Chicago, IL (US)

(*) Notice: Subject to any disclaimer, the term of this patent is extended or adjusted under 35 U.S.C. 154(b) by 334 days.

(21) Appl. No.: 17/452,866

(22) Filed: Oct. 29, 2021

(65) Prior Publication Data
US 2023/0133862 A1 May 4, 2023

(51) Int. Cl.
*G08G 5/00* (2006.01)
*B64D 45/00* (2006.01)
*G06T 11/00* (2006.01)
*G06T 11/20* (2006.01)

(52) U.S. Cl.
CPC ........... *G08G 5/0047* (2013.01); *B64D 45/00* (2013.01); *G06T 11/001* (2013.01); *G06T 11/206* (2013.01); *G08G 5/0021* (2013.01); *B64D 2045/0075* (2013.01); *G06T 2200/24* (2013.01)

(58) Field of Classification Search
CPC .... G08G 5/0047; G08G 5/0021; G08G 5/065; G06T 11/001; G06T 11/206; G06T 2200/24; G06T 11/20; G01C 23/00; G06Q 10/063; G06Q 50/30; G09B 29/006; G06F 3/0481; B64D 45/00; B64D 2045/0075; Y02T 50/80
See application file for complete search history.

(56) References Cited

U.S. PATENT DOCUMENTS

| | | | |
|---|---|---|---|
| 9,396,663 B2* | 7/2016 | Zimmer | G08G 5/0082 |
| 2014/0156114 A1* | 6/2014 | Aymeric | G01C 23/00 |
| | | | 701/3 |
| 2016/0328977 A1* | 11/2016 | Lueck | G01C 21/20 |
| 2019/0080622 A1 | 3/2019 | Gros et al. | |
| 2019/0147752 A1* | 5/2019 | Scarlatti | G08G 5/0039 |
| | | | 701/120 |
| 2019/0213897 A1* | 7/2019 | Jayathirtha | B64D 45/00 |
| 2021/0103860 A1* | 4/2021 | De Oliveira | G06Q 10/04 |
| 2021/0189977 A1 | 6/2021 | Siegmeth et al. | |
| 2021/0366297 A1* | 11/2021 | Peukert | G08G 5/0021 |

* cited by examiner

*Primary Examiner* — Ig T An
*Assistant Examiner* — Christine Nguyen Huynh
(74) *Attorney, Agent, or Firm* — Quinn IP Law (57) ABSTRACT

A method is provided for supporting taxi operation of an aircraft. The method includes accessing information that describes a taxi operation of the aircraft at an airport, for a flight of the aircraft. The method includes determining a recommendation for reduced-engine taxi operation of the aircraft based on the information. The recommendation divides the reduced-engine taxi operation into steps including reduced-engine and all-engines steps. A route for the taxi operation is plotted on a diagram of the airport, the route is annotated with an indication of the recommendation for the taxi operation, and a graphical user interface (GUI) is generated that includes the diagram with the route and the indication of the recommendation. The indication of the recommendation includes indications of the steps into which the reduced-engine taxi operation is divided, and the route is annotated to indicate segments of the route over which the steps are performed.

22 Claims, 7 Drawing Sheets

SUPPORTING AN AIRCRAFT IN A REDUCED-ENGINE TAXI OPERATION

TECHNOLOGICAL FIELD

The present disclosure relates generally to aircraft operations and, in particular, to supporting an aircraft in a reduced-engine taxi operation.

BACKGROUND

The use of aircraft and airports to move people, goods, supplies, and other objects across the country and around the world has become central aspect of modern travel, commerce, and everyday life. Increases in the use of airports tends to compound many of the technical challenges associated with safely and efficiently operating an airport and managing air traffic. Increases in the use of airports also tends to increase the amount of time aircraft spend in taxi operations, which in turn impacts the technical challenges associated with reducing fuel burn during an aircraft's landing and takeoff (LTO) cycle.

Reduced engine taxi operation, where a multiple-engine aircraft uses less than all of its engines during at least a portion of the time the plane is taxiing to or from a runway, represents one approach to reducing fuel burn during and LTO cycle. But numerous technical and operational challenges limit the ability of pilots and other individuals to use reduced-engine taxi operation to reduce fuel burn. These challenges include as the complexity of the factors impacting fuel savings, engine warm-up and cool-down durations, airport procedural constraints, dynamic traffic conditions, and the like.

It would therefore be desirable to have a system and method that takes into account at least some of the issues discussed above, as well as other possible issues.

BRIEF SUMMARY

Example implementations of the present disclosure are directed to supporting an aircraft in a reduced-engine taxi operation in which a multiple-engine aircraft using less than all of its engines during at least some of the taxi operations performed as part of the aircraft's landing and takeoff (LTO) cycle. While reduced-engine taxi operation may result in fuel savings, there are multiple factors that impose technical challenges that may result in the reduction or elimination of those fuel savings. These challenges include, for example, weather conditions, the routing of the relevant taxiway(s) at the airport, the standard operating procedures (SOP) and other aspects of the airport (such as gate and runway information), taxi queue duration, standing time, aircraft type, engine warm-up and cool-down durations, information about the aircraft's auxiliary power unit, and the like.

To overcome these and other technical challenges, example implementations of the present disclosure determine a recommendation for reduced-engine taxi operation based information that describes a taxi operation of a flight of the aircraft and/or other factors impacting reduced-engine taxi operation. In situations in which reduced-engine taxi operation is permitted, a fuel savings of reduced-engine taxi operation may be determined; and when that fuel savings is at least a threshold fuel savings, a recommendation of reduced-engine taxi operation may be presented in a graphical user interface (GUI). In this regard, a route for the taxi operation may be plotted on a diagram of the airport, and the route may be annotated on the diagram with an indication of the recommendation for the taxi operation. The GUI, then, may include the diagram with the route and the indication of the recommendation.

The present disclosure thus includes, without limitation, the following example implementations.

Some example implementations provide a method of supporting taxi operation of an aircraft at an airport, the aircraft with fuel-consuming systems that include multiple engines, the method comprising: accessing information that describes a taxi operation of the aircraft, between a gate and a runway of the airport, for a flight of the aircraft; determining a recommendation for reduced-engine taxi operation of the aircraft based on the information, the recommendation dividing the reduced-engine taxi operation into steps including a reduced-engine step performed without one or more of the multiple engines running, and an all-engines step performed with all of the multiple engines running; plotting a route for the taxi operation on a diagram of the airport, between the gate and the runway; annotating the route on the diagram with an indication of the recommendation for the taxi operation, the indication of the recommendation including indications of the steps into which the reduced-engine taxi operation is divided, the route annotated to indicate segments of the route over which the steps are performed; and generating a graphical user interface (GUI) that includes the diagram with the route and the indication of the recommendation.

Some example implementations provide an apparatus for supporting taxi operation of an aircraft at an airport, the apparatus comprising a memory configured to store computer-readable program code; and processing circuitry configured to access the memory, and execute the computer-readable program code to cause the apparatus to at least perform the method of the preceding example implementation.

Some example implementations provide a computer-readable storage medium for supporting taxi operation of an aircraft at an airport, the computer-readable storage medium being non-transitory and having computer-readable program code stored therein that, in response to execution by processing circuitry, causes an apparatus to at least perform the method of the preceding example implementation.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to vehicular engineering and, in particular, to one or more of the design, construction, operation or use of vehicles such as aircraft. As used herein, a vehicle is a machine designed as an instrument of conveyance by land, water or air. A vehicle designed and configurable to fly may at times be referred to as an aerial vehicle, an aircraft or the like. Other examples of suitable vehicles include any of a number of different types of ground vehicles (e.g., motor vehicles, railed vehicles), watercraft, amphibious vehicles, spacecraft and the like.

A vehicle generally includes a basic structure, and a propulsion system coupled to the basic structure. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more engines or motors configured to power one or more propulsors to generate propulsive forces that cause the vehicle to move. A propulsor is any of a number of different means of converting power into a propulsive force. Examples of suitable propulsors include rotors, propellers, wheels and the like. In some examples, the propulsion system includes a drivetrain configured to deliver power from the engines/motors to the propulsors. The engines/motors and drivetrain may in some contexts be referred to as the powertrain of the vehicle.

Figure 1:
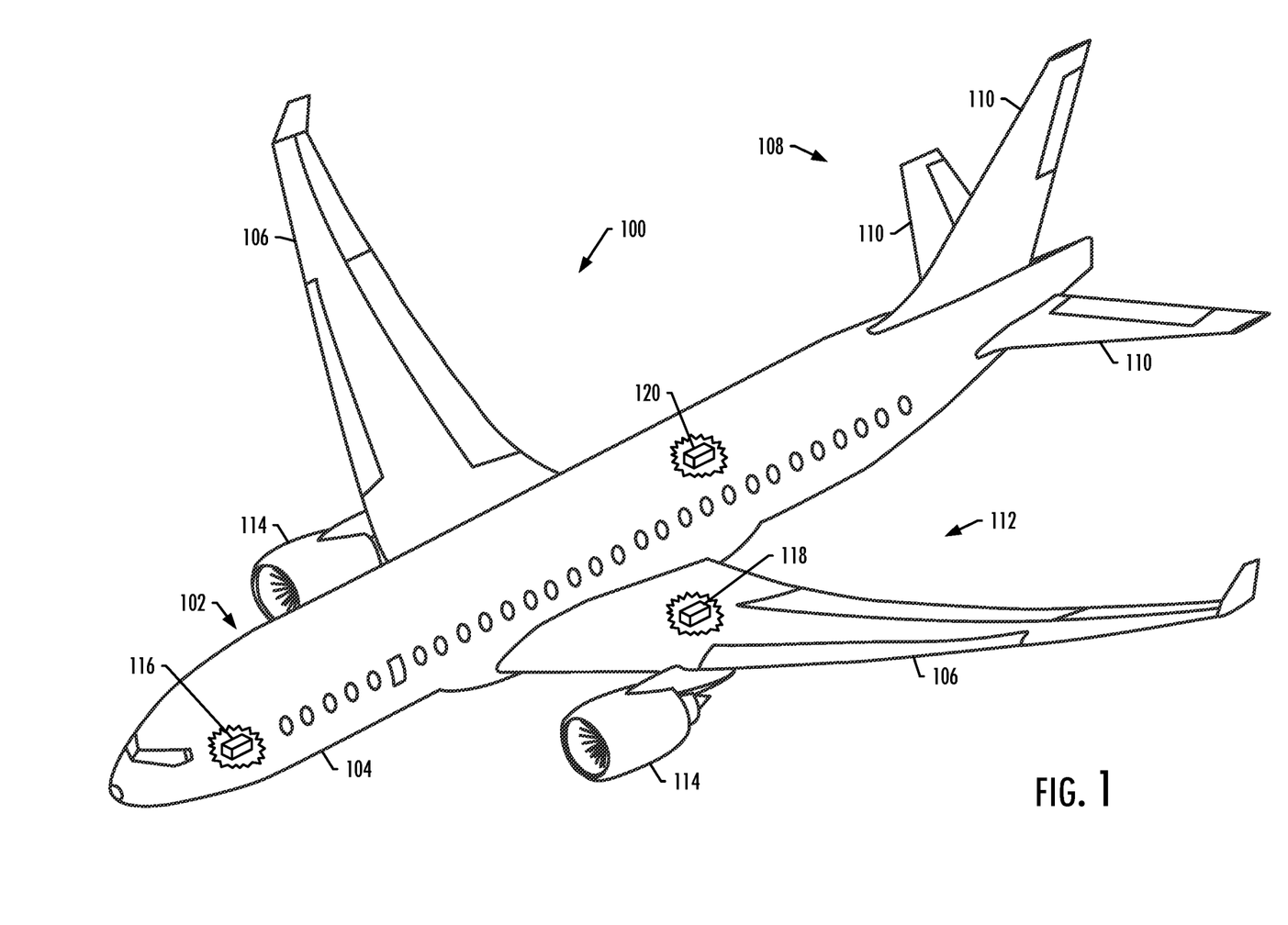
FIG. 1 illustrates one type of vehicle, namely, an aircraft that may benefit from example implementations of the present disclosure.

FIG. 1 illustrates one type of vehicle, namely, an aircraft 100 that may benefit from example implementations of the present disclosure. As shown, the aircraft includes a basic structure with an airframe 102 including a fuselage 104. The airframe also includes wings 106 that extend from opposing sides of the fuselage, an empennage or tail assembly 108 at a rear end of the fuselage, and the tail assembly includes stabilizers 110. The aircraft also includes a plurality of high-level systems 112 such as a propulsion system. In the particular example shown in FIG. 1, the propulsion system includes two wing-mounted engines 114 configured to power propulsors to generate propulsive forces that cause the aircraft to move. In other implementations, the propulsion system may include other arrangements, for example, engines carried by other portions of the aircraft including the fuselage and/or the tail. As also shown, the high-level systems may also include an electrical system 116, hydraulic system 118 and/or environmental system 120. Any number of other systems may be included, such as an auxiliary power unit (APU).

As explained above, example implementations of the present disclosure relate generally to vehicular engineering and, in particular, to one or more of the design, construction, operation or use of vehicles such as aircraft 100. Thus, referring now to FIG. 2, example implementations may be used in the context of an aircraft manufacturing and service method 200. During pre-production, the example method may include specification and design 202 of the aircraft, manufacturing sequence and processing planning 204 and material procurement 206. During production, component and subassembly manufacturing 208 and system integration 210 of the aircraft takes place. Thereafter, the aircraft may go through certification and delivery 212 in order to be placed in service 214. While in service by an operator, the aircraft may be scheduled for maintenance and service (which may also include modification, reconfiguration, refurbishment or the like).

Each of the processes of the example method 200 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

Figure 2:
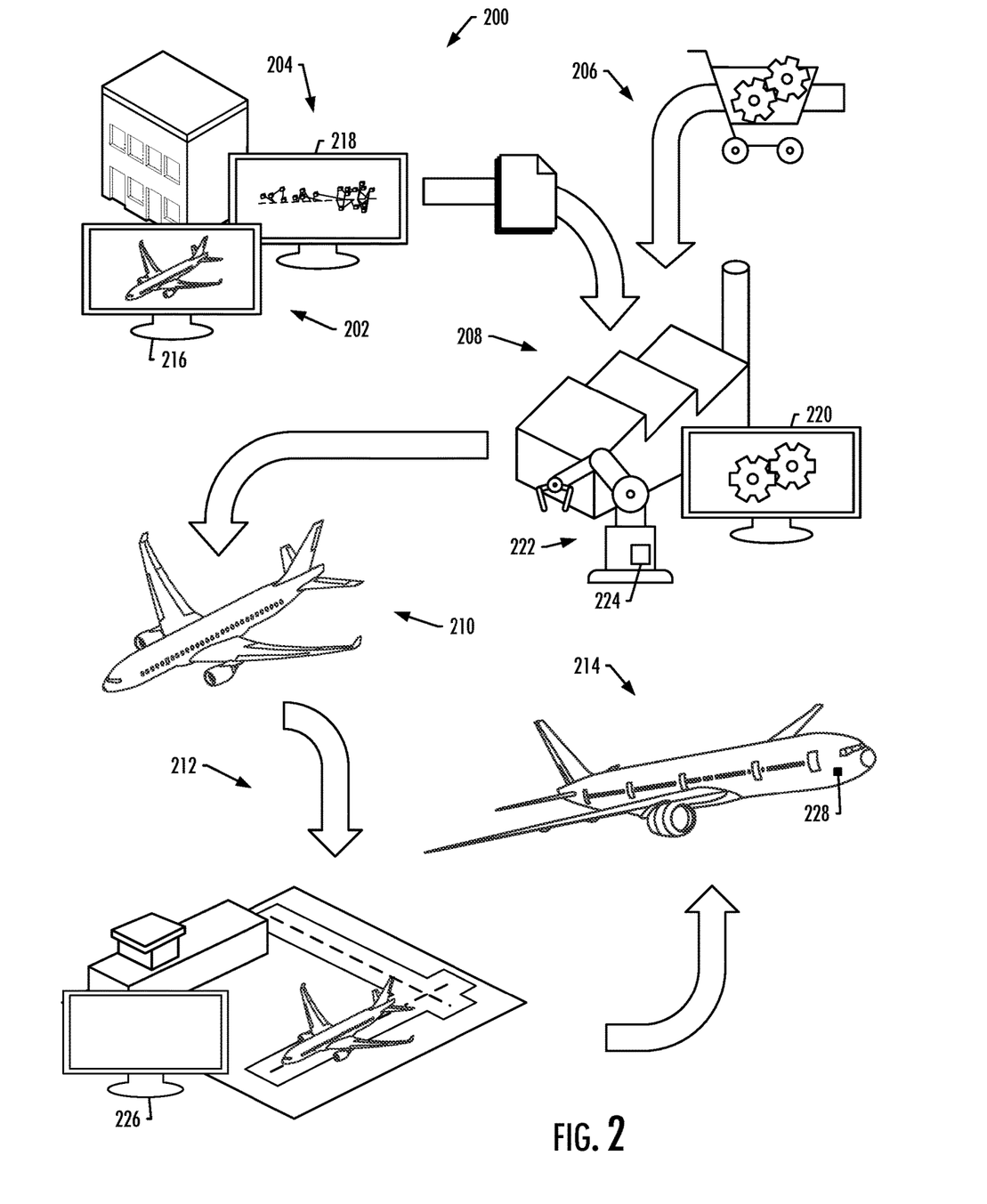
FIG. 2 illustrates an aircraft manufacturing and service method, according to some example implementations.

As will also be appreciated, computers are often used throughout the method 200; and in this regard, a "computer" is generally a machine that is programmable to programmed to perform functions or operations. The method as shown makes use of a number of example computers. These computers include computers 216, 218 used for the specification and design 202 of the aircraft, and the manufacturing sequence and processing planning 204. The method may also make use of computers 220 during component and subassembly manufacturing 208, which may also make use of computer numerical control (CNC) machines 222 or other robotics that are controlled by computers 224. Even further, computers 226 may be used while the aircraft is in service 214, as well as during maintenance and service; and as suggested in FIG. 1, the aircraft may itself include one or more computers 228 as part of or separate from its electrical system 116.

A number of the computers 216-228 used in the method 200 may be co-located or directly coupled to one another, or in some examples, various ones of the computers may communicate with one another across one or more computer networks. Further, although shown as part of the method, it should be understood that any one or more of the computers may function or operate separate from the method, without regard to any of the other computers. It should also be understood that the method may include one or more additional or alternative computers than those shown in FIG. 2.

Example implementations of the present disclosure may be implemented throughout the aircraft manufacturing and service method 200, but are particularly well suited for implementation as the aircraft is in service 214. In this regard, some example implementations provide a computer for supporting taxi operation of an aircraft at an airport. The computer may be a computer 226 configured to operate as a flight planning system for use as a flight of the aircraft is planned. Additionally or alternatively, in some examples, the computer may be a computer 228 that is configured to operate as an electronic flight bag (EFB) for use onboard the aircraft as the flight is executed.

In particular, example implementations of the present disclosure are directed to supporting an aircraft 100 in a reduced-engine taxi operation, which involves a multiple-engine aircraft using less than all of its engines 114 during at least a portion of a taxi operation. As explained above, complex factors impose technical challenges that impact the ability for reduced-engine taxi operation to result in fuel savings. These may include, for example, weather conditions, the routing of the relevant taxiway(s) at the airport, the standard operating procedures (SOP) and other aspects of the airport (such as gate and runway information), taxi queue duration, standing time, aircraft type, engine warm-up and cool-down durations, information about the aircraft's auxiliary power unit, and the like.

To overcome these and other technical challenges, example implementations of the present disclosure determine a recommendation for reduced-engine taxi operation based on information that describes a taxi operation of a flight of the aircraft (and that may include factors impacting reduced-engine taxi operation). In situations in which reduced-engine taxi operation is permitted, a fuel savings of reduced-engine taxi operation may be determined. Some example implementations involve applying at least some of the information to two models—one trained to predict and produce a prediction of fuel burn (e.g., estimated amount of fuel utilized) for fuel-consuming systems during normal taxi operation, and a second model trained to predict and produce a prediction for the fuel-consuming systems during reduced-engine taxi operation. When the fuel savings is at least a threshold fuel savings, a recommendation of reduced-engine taxi operation may be presented in a graphical user interface (GUI).

Figure 3:
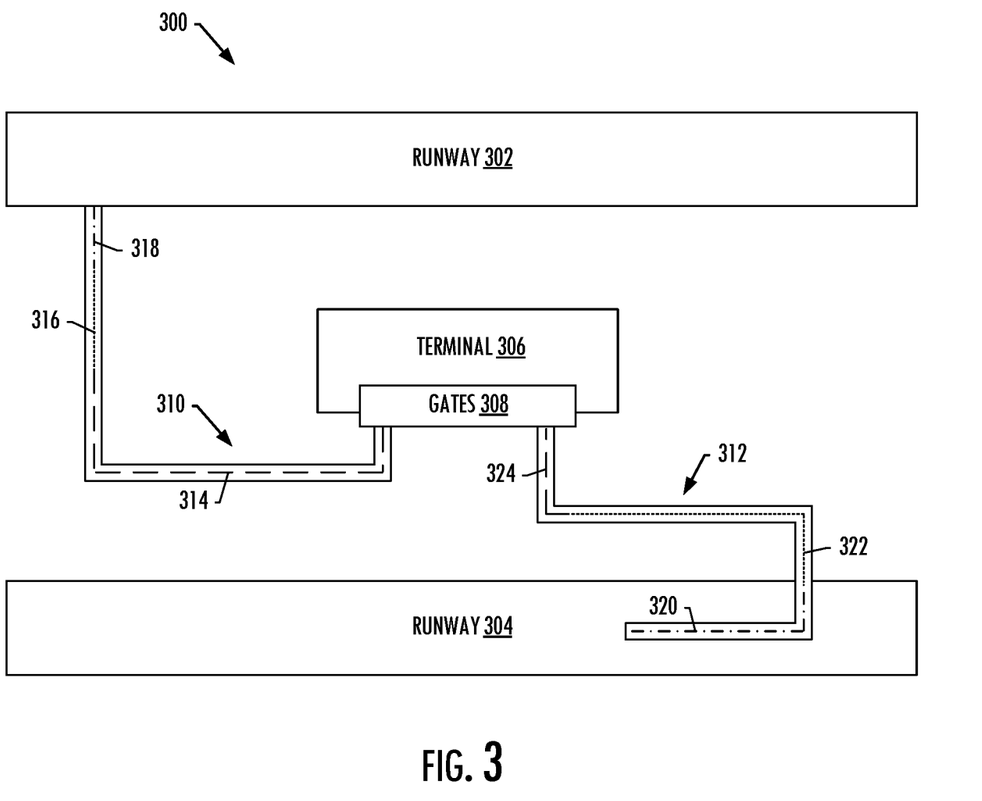
FIG. 3 is a block diagram of an airport according to some example implementations.

FIG. 3 is a block diagram of an airport 300 according to some example implementations of the present disclosure. As shown, the airport includes a runway 302 that may be used by departing aircraft 100 for takeoff operations, and another runway 304 that may be used by arriving aircraft for landing operations. The airport also includes at least one terminal 306, and the terminal has one or more gates 308 at which the aircraft may stand while passengers and/or cargo board or deplane the aircraft. The airport also includes a taxiway 310 leading from a gate to the runway 302, and another taxiway 312 leading from the runway 304 to a gate.

According to some example implementations of the present disclosure, a recommendation for reduced-engine taxi operation may be determined for an aircraft 100 perform a taxi-out operation in which the aircraft travels from its gate 308 to the runway 302 for departure. The recommendation for the taxi-out operation may divide the reduced-engine taxi operation into steps including a reduced-engine step 314 in which the aircraft travels from the gate without one or more of the multiple engines 114 running, a transition step 316 in which the one or more of the engines are turned on and in a warmup state, and an all-engines step 318 performed with all of the multiple engines running.

Similar to a taxi-out operation, a recommendation for reduced-engine taxi operation may also be determined for an aircraft 100 perform a taxi-in operation in which the aircraft travels from the runway 304 on arrival, to its gate 308. The recommendation for the taxi-in operation, may divide the reduced-engine taxi operation into steps including an all-engines step 320 in which the aircraft travels from the runway with all of the multiple engines 114 running, a transition step 322 in which one or more of the multiple engines are shut down and in a cool-down state, and a reduced-engine step 324 performed without the one or more of the multiple engines running.

The recommendation for reduced-engine taxi operation may be determined in any of a number of different manners.

Figure 4:
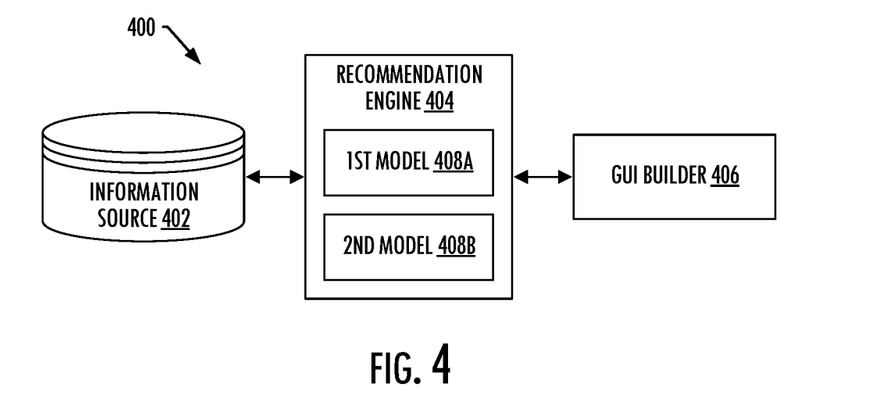
FIG. 4 illustrates a system for supporting taxi operation of an aircraft at an airport, according to some example implementations.

FIG. 4 is a block diagram of a system 400 for supporting taxi operation of an aircraft 100 at an airport 300, which may be implemented by either or both computer 226 or computer 228, according to example implementations of the present disclosure. The system 400 includes any of a number of different subsystems (each an individual system) for performing one or more functions or operations. As shown, in some examples, the system 400 includes one or more of each of an information source 402, a recommendation engine 404, and a graphical user interface (GUI) builder 406. As also shown, the recommendation engine may incorporate one or more models, such as one or more machine learning (ML) models. These models may include a first model 408A and a second model 408B. The subsystems may be co-located or directly coupled to one another, or in some examples, various ones of the subsystems may communicate with one another across one or more computer networks. It should also be understood that one or more of the subsystems may function or operate as a separate system without regard to any of the other subsystems, and that the system may include one or more additional or alternative subsystems than those shown in FIG. 4.

According to some example implementations, the recommendation engine 404 is generally configured to access information from the information source 402 that describes a taxi operation of an aircraft 100, between a gate 308 and a runway 302, 304 of the airport 300, for a flight of the aircraft. In this regard, a taxi-out operation may be from the gate to the runway; and a taxi-in operation may be from the runway to the gate. The recommendation engine is then configured to determine a recommendation for reduced-engine taxi operation of the aircraft based on the information.

The information accessed from the information source 402 may include any of a number of different types of information. In some examples in which the system 400 is implemented by a computer 226 configured to operate as a flight planning system, the information may include an expected taxi clearance that describes a route that the aircraft 100 is expected to be authorized to travel between the gate 308 and the runway 302, 304. In example sin which the system is implemented by a computer 228 configured to operate as an EFB, the information may include a taxi clearance that describes the route that the aircraft is authorized to travel between the gate and the runway.

The information accessed from the information source 402 may also include any information or combination of information that affects a decision on whether, when, and/or how reduced-engine taxi operation should be implemented in a given situation. Other examples of suitable information include a predicted taxi duration of the taxi operation, and the predicted taxi duration may include a queue duration in which the aircraft 100 is standing. The information may include any one or more of an engine warmup duration, engine cool-down duration, type of aircraft, aircraft weight and the like. The information may include any one or more of weather conditions at the airport 300, standard operations procedures (SOP) of the airport, airport diagram or other airport-related information, a gate 308, given runway 302, 304, and the like. In some example implementations, the information includes a pushback time of the aircraft from a gate of the airport and an engine-warmup duration.

In some example implementations, the recommendation engine 404 is configured to determine whether reduced-engine taxi operation of the aircraft 100 is permitted based on the predicted taxi duration and/or weather conditions. Additionally or alternatively, the recommendation engine may determine whether reduced-engine taxi operation of the aircraft is permitted based on the SOP of the airport 300. In these examples, the recommendation engine may be configured to determine the recommendation for reduced-engine taxi operation when reduced-engine taxi operation is permitted.

In some example implementations, the recommendation may depend on fuel savings of reduced-engine taxi operation. In some of these examples, the recommendation engine 404 is configured to determine a fuel savings of reduced-engine taxi operation for at least the reduced-engine step 314, 324. This may include the recommendation engine configured to apply at least some of the information from the information source 402 to the first and second models 408A, 408B trained to predict and thereby produce predictions of fuel burn for fuel-consuming systems (e.g., engines 114, APU) of the aircraft 100.

The first and second models 408A, 408B may be trained independent of or dependent on the type of the aircraft 100; and if dependent on the type of aircraft, the first and second models may be trained to produce predictions that are specific to the type of the aircraft. Likewise, the first and second models may be trained independent of or dependent on one or more of the airport 300, the terminal 306, the gates 308, the taxiways 310, 312 or the runways 203, 304. In this regard, the first and second models in some examples may be trained to produce predictions that are specific to the airport, and may be further trained to produce predictions that are even specific to routes on the taxiways between the gates and the runways at the airport.

In some example implementations, the recommendation engine 404 may be configured to apply the predicted taxi duration (including queue duration) and aircraft weight to the first model 408A trained to predict and thereby produce a first prediction of fuel burn for respective ones of the fuel-consuming systems for a normal taxi operation of the aircraft 100. The recommendation engine may similarly apply the predicted taxi duration (including queue duration), the engine-warmup/cool-down duration, and the aircraft weight to the second model 408B trained to predict and thereby produce a second prediction of fuel burn for respective ones of the fuel-consuming systems for reduced-engine taxi operation. The recommendation engine may then determine a difference between the first prediction of fuel burn and the second prediction of fuel burn that indicates the fuel savings of reduced-engine taxi operation relative to normal taxi operation.

Again, the recommendation engine 404 is generally configured to determine a recommendation for reduced-engine taxi operation of the aircraft 100 based on information from the information source 402 that describes a taxi operation of an aircraft 100, between a gate 308 and a runway 302, 304 of the airport 300. The recommendation divides the reduced-engine taxi operation into steps including a reduced-engine step 314, 324 performed without one or more of the multiple engines 114 running, and an all-engines step 318, 320 performed with all of the multiple engines running. In some examples, the steps of the reduced-engine taxi operation further include a transition step 316, 322 between the reduced-engine step and the all-engines step, the transition step performed with the one or more of the multiple engines in a warmup or cool-down state. And in some examples in which the information from the information source includes the predicted taxi duration of the taxi operation, the recommendation engine is configured to determine durations of the steps (e.g., reduced-engine, transition, all-engines) of the reduced-engine taxi operation from the predicted taxi duration.

More information regarding the recommendation engine 404 (referred to as a taxi operation support system) of some example implementations, see U.S. patent application Ser. No. 16/877,912, entitled: Reduced Engine Taxi Predictor, filed May 19, 2020, the content of which is incorporated by reference in its entirety.

Regardless of the exact manner by which the recommendation for reduced-engine taxi operation is determined, the GUI builder 406 is configured to plot a route for the taxi operation on a diagram of the airport 300, between the gate and the runway. In some examples in which the system is used with a flight planning system (e.g., computer 226), the information from the information source 402 includes an expected taxi clearance that describes the route that the aircraft is expected to be authorized to travel between the gate and the runway; and in some of these examples, the route is plotted using the expected taxi clearance. In other examples in which the system is used with an EFB (e.g., computer 228), the information includes a taxi clearance that describes the route that the aircraft is authorized to travel between the gate and the runway, and the route is plotted using the taxi clearance.

The GUI builder 406 is configured to annotate the route on the diagram with an indication of the recommendation for the taxi operation. In this regard, the indication of the recommendation includes indications of the steps into which the reduced-engine taxi operation is divided, and the route is annotated to indicate segments of the route over which the steps are performed. The GUI builder, then, is configured to generate a graphical user interface (GUI) that includes the diagram with the route and the indication of the recommendation.

Figure 5:
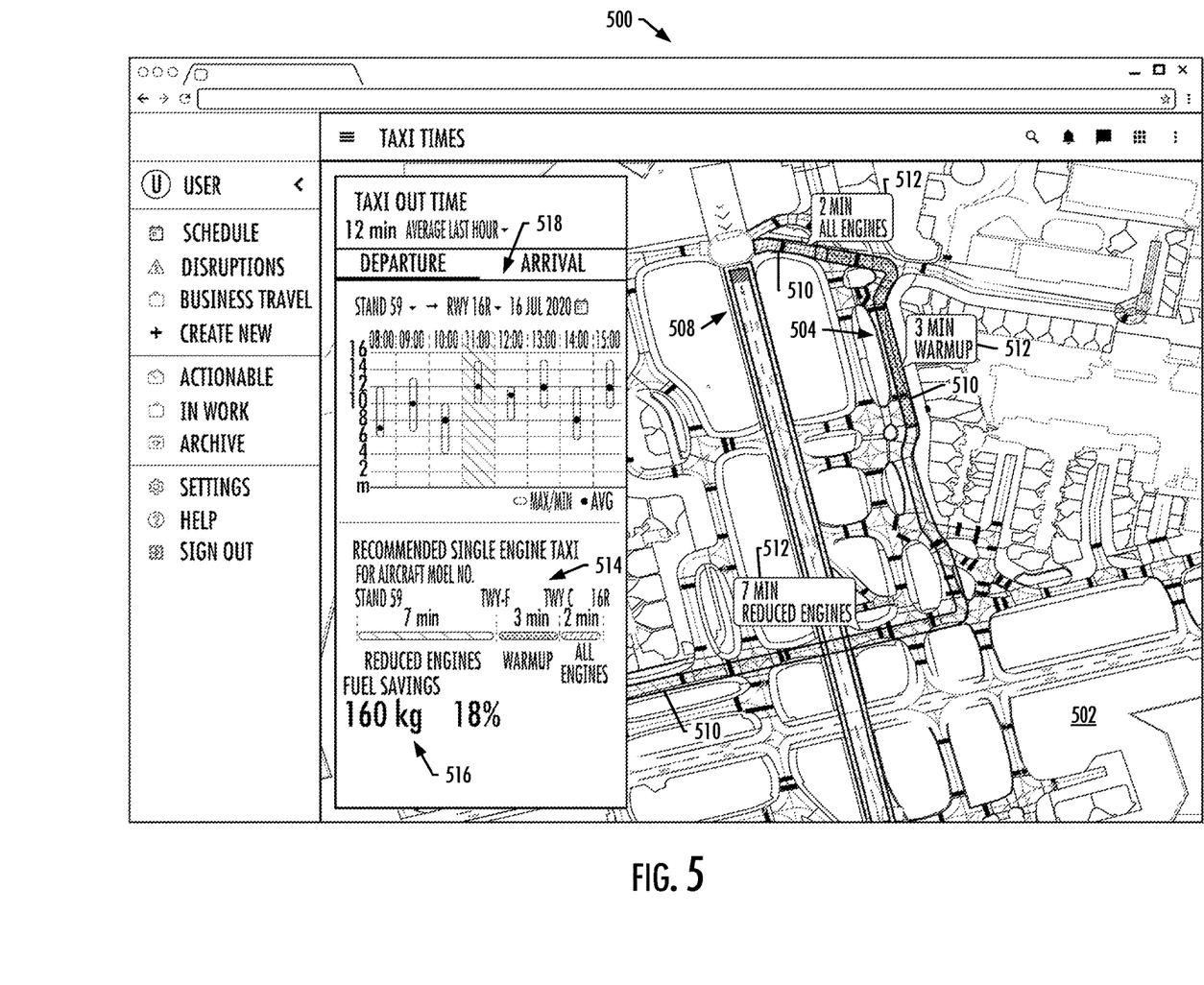
FIGS. 5 and 6 illustrate graphical user interfaces (GUIs) that may be generated, according to some example implementations.

FIG. 5 illustrates a GUI 500 that may be generated by the system 400 for a taxi-out operation, when implemented by a computer 226 configured to operate as a flight planning system, according to some example implementations. As shown, the GUI includes a diagram 502 of the airport, and a route 504 for a taxi operation of an aircraft 100, between a gate (obscured in FIG. 5) and a runway 508. In some examples, the route is annotated with the indications of the steps using either or both of a color-coded overlay on the route to indicate the segments of the route over which the steps are performed, or using callouts that identify the steps, and that are connected to the segments of the route. In FIG. 5, the steps are annotated using both a color-coded overlay 510 and callouts 512 (the transition step labeled "warmup" for the taxi-out operation).

In some examples in which the recommendation includes durations of the steps from the predicted taxi duration, the route 504 is annotated in the GUI 500 with the indications of the steps that includes the durations, as shown by the lengths of the color-coded overlay 510 and in the callouts 512. Additionally or alternatively, in some examples, the GUI also includes a bar chart 514 that represents the steps with bars with lengths proportional to the durations of the steps, and that indicates segments of the route at which the reduced-engine taxi operation transitions between the steps. And as also shown, the GUI indicates the fuel savings 516 of the reduced-engine taxi operation (shown in both weight and percentage).

In some examples, the flight of the aircraft 100 is planned for a specified day, for a specified departure or arrival time at the airport. The GUI that is generated, then, may also include a chart 518 that represents historical taxi durations between the gate and the runway on the specified day, for a number of departure or arrival times. The information from which the recommendation is determined by the recommendation engine 404 may further include a predicted taxi duration of the taxi operation, and the predicted taxi duration may be determined for the specified departure or arrival time from the historical taxi durations. For the taxi-out operation in FIG. 5, the specified departure time is 11:00; and for the specified departure time, the average taxi duration is 12 minutes, which may be taken as the predicted taxi duration.

Figure 6:
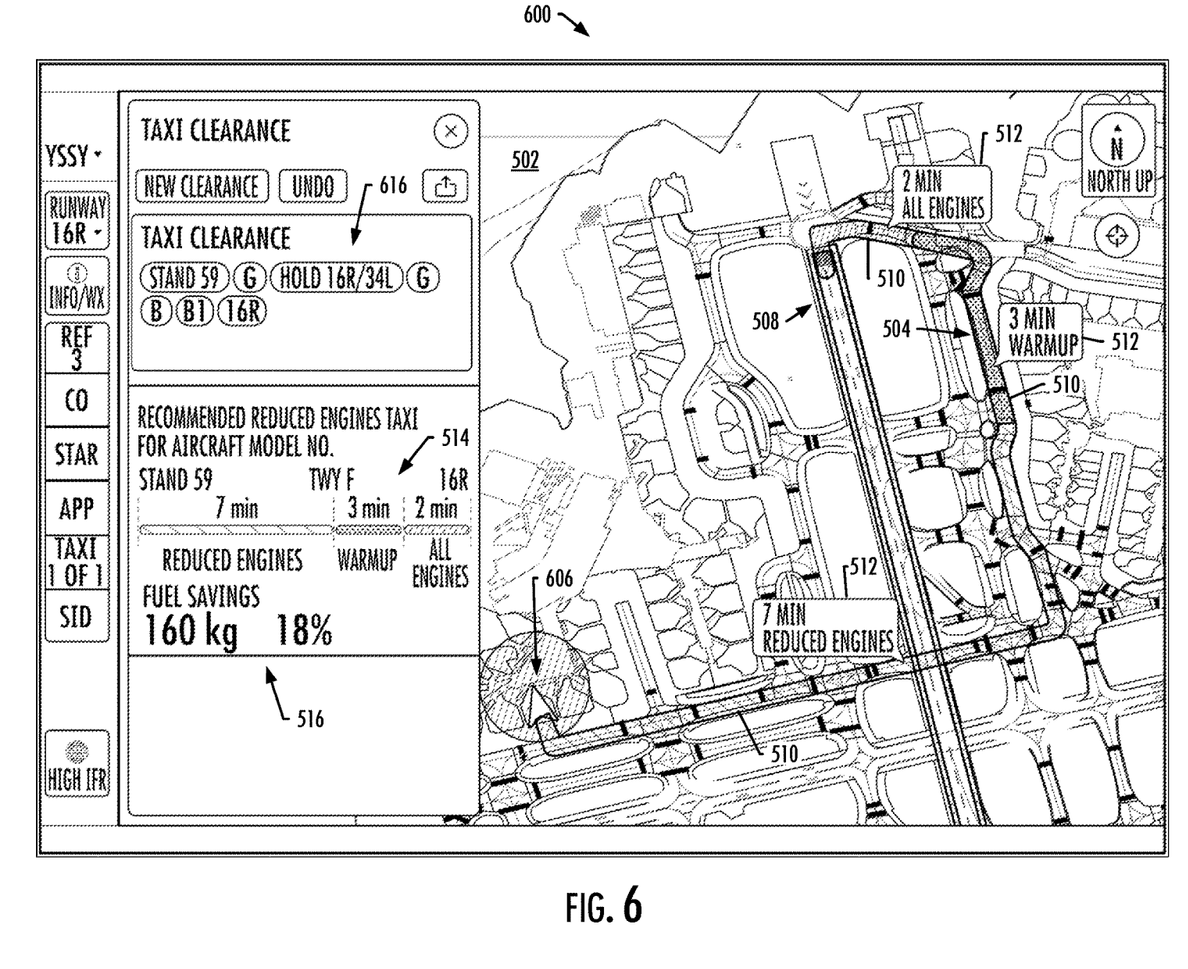

FIG. 6 illustrates a GUI 600 that may be generated by the system for the taxi-out operation, when implemented by a computer 228 configured to operate as an EFB for use onboard the aircraft 100, according to some example implementations. The GUI 600 shown in FIG. 6 is similar to the GUI 500 shown in FIG. 5. In this regard, the GUI includes the diagram 502 of the airport, and the route 504 for a taxi operation of the aircraft 100, between a gate 606 (shown in FIG. 6) and a runway 508. As also shown, similar to FIG. 5, the GUI 600 in FIG. 6, the steps of the reduced-engine taxi operation are annotated using both a color-coded overlay 510 and callouts 512 (the transition step labeled "warmup" for the taxi-out operation). The GUI 600 includes a bar chart 514 that represents the steps with bars with lengths proportional to the durations of the steps, and the GUI indicates the fuel savings 516 of the reduced-engine taxi operation (shown in both weight and percentage).

The GUI 600 shown in FIG. 6 also specifies the taxi clearance 616 that describes the route 504 that the aircraft 100 is authorized to travel between the gate 606 and the runway 508.

Figure 7:
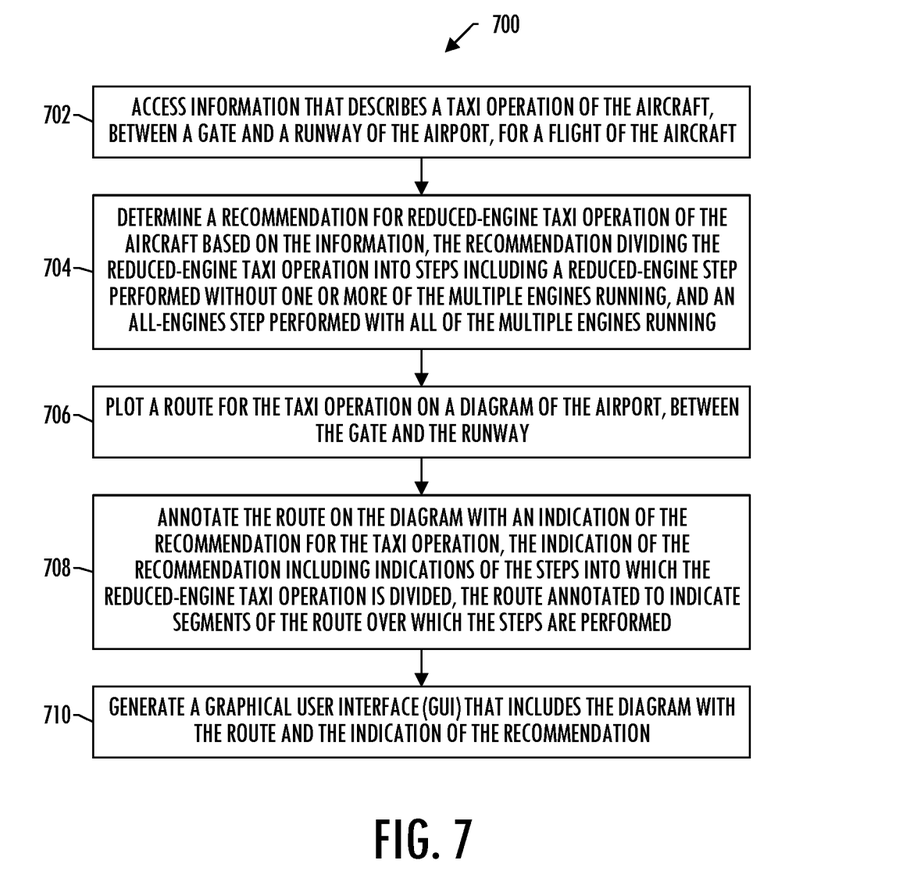
FIG. 7 is a flowchart illustrating various steps in a method of supporting taxi operation of an aircraft at an airport, according to example implementations.

FIG. 7 is a flowchart illustrating various steps in a method 700 of supporting taxi operation of an aircraft at an airport the aircraft with fuel-consuming systems that include multiple engines, according to various example implementations of the present disclosure. The method includes accessing information that describes a taxi operation of the aircraft, between a gate and a runway of the airport, for a flight of the aircraft, as shown at block 702. The method includes determining a recommendation for reduced-engine taxi operation of the aircraft based on the information, the recommendation dividing the reduced-engine taxi operation into steps including a reduced-engine step performed without one or more of the multiple engines running, and an all-engines step performed with all of the multiple engines running, as shown at block 704.

The method 700 includes plotting a route for the taxi operation on a diagram of the airport, between the gate and the runway, as shown at block 706. The method includes annotating the route on the diagram with an indication of the recommendation for the taxi operation, the indication of the recommendation including indications of the steps into which the reduced-engine taxi operation is divided, the route annotated to indicate segments of the route over which the steps are performed, as shown at block 708. And the method includes generating a graphical user interface (GUI) that includes the diagram with the route and the indication of the recommendation, as shown at block 710.

In some examples, the steps of the reduced-engine taxi operation further include a transition step between the reduced-engine step and the all-engines step, the transition step performed with the one or more of the multiple engines in a warmup or cool-down state.

In some examples, the information further includes a predicted taxi duration of the taxi operation, and determining the recommendation at block 704 includes determining durations of the steps from the predicted taxi duration, and In some of these examples, the route is annotated at block 708 with the indications of the steps that includes the durations.

In some examples, the route is annotated at block 708 with the indications of the steps using a color-coded overlay on the route to indicate the segments of the route over which the steps are performed.

In some examples, the route is annotated at block 708 with the indications of the steps using callouts that identify the steps, and that are connected to the segments of the route over which the steps are performed.

In some examples, the route is annotated at block 708 with the indications of the steps using at least one of a color-coded overlay on the route to indicate the segments of the route over which the steps are performed, or callouts that identify the steps, and that are connected to the segments of the route.

In some examples, the information further includes a predicted taxi duration of the taxi operation, and determining the recommendation at block 704 includes determining durations of the steps from the predicted taxi duration, and In some of these examples, the GUI that is generated at block 710 also includes a bar chart that represents the steps with bars with lengths proportional to the durations of the steps, and that indicates segments of the route at which the reduced-engine taxi operation transitions between the steps.

In some examples, determining the recommendation at block 704 includes determining a fuel savings of the reduced-engine taxi operation from at least the reduced-engine step. In some of these examples, the GUI that is generated at block 710 also indicates the fuel savings.

In some examples, the GUI is generated at block 710 for display by a flight planning system for use as the flight is planned.

In some examples, the information includes an expected taxi clearance that describes the route that the aircraft is expected to be authorized to travel between the gate and the runway, and the route is plotted at block 706 using the expected taxi clearance.

In some examples, the flight of the aircraft is planned for a specified day, for a specified departure or arrival time at the airport. In some of these examples, the GUI that is generated at block 710 also includes a chart that represents historical taxi durations between the gate and the runway on the specified day, for a number of departure or arrival times. In some of these examples, the information from which the recommendation is determined at block 704 further includes a predicted taxi duration of the taxi operation, and the predicted taxi duration is determined for the specified departure or arrival time from the historical taxi durations.

In some examples, the GUI is generated at block 710 for display by an electronic flight bag (EFB) for use onboard the aircraft as the flight is executed.

In some examples, the information includes a taxi clearance that describes the route that the aircraft is authorized to travel between the gate and the runway, and the route is plotted at block 706 using the taxi clearance.

In some examples, the GUI that is generated at block 710 also specifies the taxi clearance.

According to example implementations of the present disclosure, again, the system 400 for supporting taxi operation of the aircraft 100 may be implemented by either or both computer 226 or computer 228. The computer, in turn, may include hardware, alone or under direction of one or more computer programs from a computer-readable storage medium. In some examples, one or more apparatuses may be configured to function as or otherwise implement the computer shown and described herein. In examples involving more than one apparatus, the respective apparatuses may be connected to or otherwise in communication with one another in a number of different manners, such as directly or indirectly via a wired or wireless network or the like.

Figure 8:
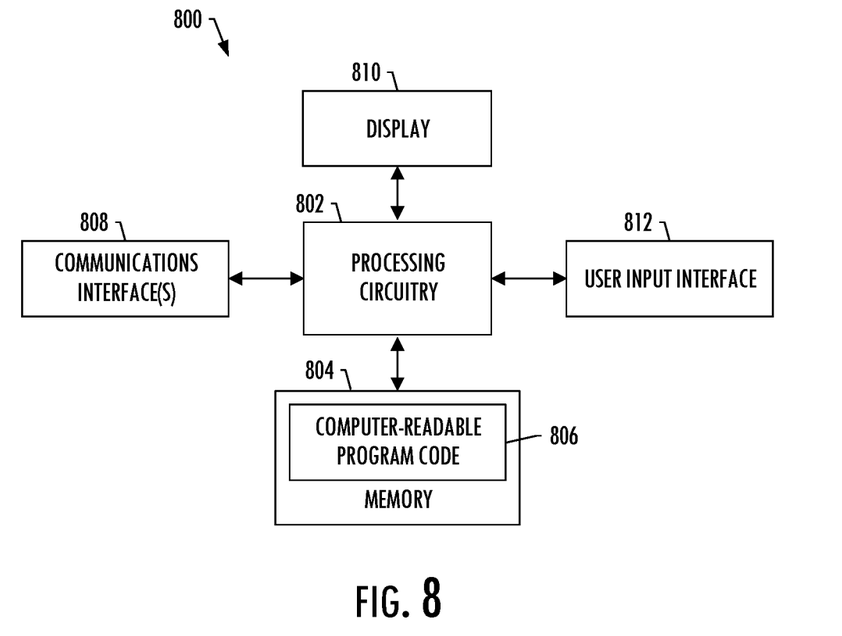
FIG. 8 illustrates an apparatus according to some example implementations.

FIG. 8 illustrates an apparatus 800 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 802 (e.g., processor unit) connected to a memory 804 (e.g., storage device).

The processing circuitry 802 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 804 (of the same or another apparatus).

The processing circuitry 802 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 804 is generally any piece of computer hardware that is capable of storing information such as, for example, data, computer programs (e.g., computer-readable program code 806) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 804, the processing circuitry 802 may also be connected to one or more interfaces for displaying, transmitting and/or receiving information. The interfaces may include a communications interface 808 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 810 and/or one or more user input interfaces 812 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 800 may include a processing circuitry 802 and a computer-readable storage medium or memory 804 coupled to the processing circuitry, where the processing circuitry is configured to execute computer-readable program code 806 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for supporting taxi operation of an aircraft at an airport, the aircraft with fuel-consuming systems that include multiple engines, the apparatus comprising: a memory configured to store computer-readable program code; and processing circuitry configured to access the memory, and execute the computer-readable program code to cause the apparatus to at least: access information that describes a taxi operation of the aircraft, between a gate and a runway of the airport, for a flight of the aircraft; determine a recommendation for reduced-engine taxi operation of the aircraft based on the information, the recommendation dividing the reduced-engine taxi operation into steps including a reduced-engine step performed without one or more of the multiple engines running, and an all-engines step performed with all of the multiple engines running; plot a route for the taxi operation on a diagram of the airport, between the gate and the runway; annotate the route on the diagram with an indication of the recommendation for the taxi operation, the indication of the recommendation including indications of the steps into which the reduced-engine taxi operation is divided, the route annotated to indicate segments of the route over which the steps are performed; and generate a graphical user interface (GUI) that includes the diagram with the route and the indication of the recommendation.

Clause 2. The apparatus of clause 1, wherein the steps of the reduced-engine taxi operation further include a transition step between the reduced-engine step and the all-engines step, the transition step performed with the one or more of the multiple engines in a warmup or cool-down state.

Clause 3. The apparatus of clause 1 or clause 2, wherein the information further includes a predicted taxi duration of the taxi operation, and the apparatus caused to determine the recommendation includes the apparatus caused to determine durations of the steps from the predicted taxi duration, and wherein the route is annotated with the indications of the steps that includes the durations.

Clause 4. The apparatus of any of clauses 1 to 3, wherein the route is annotated with the indications of the steps using a color-coded overlay on the route to indicate the segments of the route over which the steps are performed.

Clause 5. The apparatus of any of clauses 1 to 4, wherein the route is annotated with the indications of the steps using callouts that identify the steps, and that are connected to the segments of the route over which the steps are performed.

Clause 6. The apparatus of any of clauses 1 to 5, wherein the route is annotated with the indications of the steps using at least one of a color-coded overlay on the route to indicate the segments of the route over which the steps are performed, or callouts that identify the steps, and that are connected to the segments of the route.

Clause 7. The apparatus of any of clauses 1 to 6, wherein the information further includes a predicted taxi duration of the taxi operation, and the apparatus caused to determine the recommendation includes the apparatus caused to determine durations of the steps from the predicted taxi duration, and wherein the GUI that is generated also includes a bar chart that represents the steps with bars with lengths proportional to the durations of the steps, and that indicates segments of the route at which the reduced-engine taxi operation transitions between the steps.

Clause 8. The apparatus of any of clauses 1 to 7, wherein the apparatus caused to determine the recommendation includes the apparatus caused to determine a fuel savings of the reduced-engine taxi operation from at least the reduced-engine step, and wherein the GUI that is generated also indicates the fuel savings.

Clause 9. The apparatus of any of clauses 1 to 8, wherein the GUI is generated for display by a flight planning system for use as the flight is planned.

Clause 10. The apparatus of clause 9, wherein the information includes an expected taxi clearance that describes the route that the aircraft is expected to be authorized to travel between the gate and the runway, and the route is plotted using the expected taxi clearance.

Clause 11. The apparatus of clause 10, wherein the flight of the aircraft is planned for a specified day, for a specified departure or arrival time at the airport, wherein the GUI that is generated also includes a chart that represents historical taxi durations between the gate and the runway on the specified day, for a number of departure or arrival times, and wherein the information from which the recommendation is determined further includes a predicted taxi duration of the taxi operation, and the predicted taxi duration is determined for the specified departure or arrival time from the historical taxi durations.

Clause 12. The apparatus of any of clauses 1 to 11, wherein the GUI is generated for display by an electronic flight bag (EFB) for use onboard the aircraft as the flight is executed.

Clause 13. The apparatus of clause 12, wherein the information includes a taxi clearance that describes the route that the aircraft is authorized to travel between the gate and the runway, and the route is plotted using the taxi clearance.

Clause 14. The apparatus of clause 13, wherein the GUI that is generated also specifies the taxi clearance.

Clause 15. A method of supporting taxi operation of an aircraft at an airport, the aircraft with fuel-consuming systems that include multiple engines, the method comprising: accessing information that describes a taxi operation of the aircraft, between a gate and a runway of the airport, for a flight of the aircraft; determining a recommendation for reduced-engine taxi operation of the aircraft based on the information, the recommendation dividing the reduced-engine taxi operation into steps including a reduced-engine step performed without one or more of the multiple engines running, and an all-engines step performed with all of the multiple engines running; plotting a route for the taxi operation on a diagram of the airport, between the gate and the runway; annotating the route on the diagram with an indication of the recommendation for the taxi operation, the indication of the recommendation including indications of the steps into which the reduced-engine taxi operation is divided, the route annotated to indicate segments of the route over which the steps are performed; and generating a graphical user interface (GUI) that includes the diagram with the route and the indication of the recommendation.

Clause 16. The method of clause 15, wherein the steps of the reduced-engine taxi operation further include a transition step between the reduced-engine step and the all-engines step, the transition step performed with the one or more of the multiple engines in a warmup or cool-down state.

Clause 17. The method of clause 15 or clause 16, wherein the information further includes a predicted taxi duration of the taxi operation, and determining the recommendation includes determining durations of the steps from the predicted taxi duration, and wherein the route is annotated with the indications of the steps that includes the durations.

Clause 18. The method of any of clauses 15 to 17, wherein the route is annotated with the indications of the steps using a color-coded overlay on the route to indicate the segments of the route over which the steps are performed.

Clause 19. The method of any of clauses 15 to 18, wherein the route is annotated with the indications of the steps using callouts that identify the steps, and that are connected to the segments of the route over which the steps are performed.

Clause 20. The method of any of clauses 15 to 19, wherein the route is annotated with the indications of the steps using at least one of a color-coded overlay on the route to indicate the segments of the route over which the steps are performed, or callouts that identify the steps, and that are connected to the segments of the route.

Clause 21. The method of any of clauses 15 to 20, wherein the information further includes a predicted taxi duration of the taxi operation, and determining the recommendation includes determining durations of the steps from the predicted taxi duration, and wherein the GUI that is generated also includes a bar chart that represents the steps with bars with lengths proportional to the durations of the steps, and that indicates segments of the route at which the reduced-engine taxi operation transitions between the steps.

Clause 22. The method of any of clauses 15 to 21, wherein determining the recommendation includes determining a fuel savings of the reduced-engine taxi operation from at least the reduced-engine step, and wherein the GUI that is generated also indicates the fuel savings.

Clause 23. The method of any of clauses 15 to 22, wherein the GUI is generated for display by a flight planning system for use as the flight is planned.

Clause 24. The method of clause 23, wherein the information includes an expected taxi clearance that describes the route that the aircraft is expected to be authorized to travel between the gate and the runway, and the route is plotted using the expected taxi clearance.

Clause 25. The method of clause 24, wherein the flight of the aircraft is planned for a specified day, for a specified departure or arrival time at the airport, wherein the GUI that is generated also includes a chart that represents historical taxi durations between the gate and the runway on the specified day, for a number of departure or arrival times, and wherein the information from which the recommendation is determined further includes a predicted taxi duration of the taxi operation, and the predicted taxi duration is determined for the specified departure or arrival time from the historical taxi durations.

Clause 26. The method of any of clauses 15 to 25, wherein the GUI is generated for display by an electronic flight bag (EFB) for use onboard the aircraft as the flight is executed.

Clause 27. The method of clause 26, wherein the information includes a taxi clearance that describes the route that the aircraft is authorized to travel between the gate and the runway, and the route is plotted using the taxi clearance.

Clause 28. The method of clause 27, wherein the GUI that is generated also specifies the taxi clearance.

Clause 29. A computer-readable storage medium for supporting taxi operation of an aircraft at an airport, the aircraft with fuel-consuming systems that include multiple engines, the computer-readable storage medium being non-transitory and having computer-readable program code stored therein that, in response to execution by processing circuitry, causes an apparatus to at least: access information that describes a taxi operation of the aircraft, between a gate and a runway of the airport, for a flight of the aircraft; determine a recommendation for reduced-engine taxi operation of the aircraft based on the information, the recommendation dividing the reduced-engine taxi operation into steps including a reduced-engine step performed without one or more of the multiple engines running, and an all-engines step performed with all of the multiple engines running; plot a route for the taxi operation on a diagram of the airport, between the gate and the runway; annotate the route on the diagram with an indication of the recommendation for the taxi operation, the indication of the recommendation including indications of the steps into which the reduced-engine taxi operation is divided, the route annotated to indicate segments of the route over which the steps are performed; and generate a graphical user interface (GUI) that includes the diagram with the route and the indication of the recommendation.

Clause 30. The computer-readable storage medium of clause 29, wherein the steps of the reduced-engine taxi operation further include a transition step between the reduced-engine step and the all-engines step, the transition step performed with the one or more of the multiple engines in a warmup or cool-down state.

Clause 31. The computer-readable storage medium of clause 29 or clause 30, wherein the information further includes a predicted taxi duration of the taxi operation, and the apparatus caused to determine the recommendation includes the apparatus caused to determine durations of the steps from the predicted taxi duration, and wherein the route is annotated with the indications of the steps that includes the durations.

Clause 32. The computer-readable storage medium of any of clauses 29 to 31, wherein the route is annotated with the indications of the steps using a color-coded overlay on the route to indicate the segments of the route over which the steps are performed.

Clause 33. The computer-readable storage medium of any of clauses 29 to 32, wherein the route is annotated with the indications of the steps using callouts that identify the steps, and that are connected to the segments of the route over which the steps are performed.

Clause 34. The computer-readable storage medium of any of clauses 29 to 33, wherein the route is annotated with the indications of the steps using at least one of a color-coded overlay on the route to indicate the segments of the route over which the steps are performed, or call outs that identify the steps, and that are connected to the segments of the route.

Clause 35. The computer-readable storage medium of any of clauses 29 to 34, wherein the information further includes a predicted taxi duration of the taxi operation, and the apparatus caused to determine the recommendation includes the apparatus caused to determine durations of the steps from the predicted taxi duration, and wherein the GUI that is generated also includes a bar chart that represents the steps with bars with lengths proportional to the durations of the steps, and that indicates segments of the route at which the reduced-engine taxi operation transitions between the steps.

Clause 36. The computer-readable storage medium of any of clauses 29 to 35, wherein the apparatus caused to determine the recommendation includes the apparatus caused to determine a fuel savings of the reduced-engine taxi operation from at least the reduced-engine step, and wherein the GUI that is generated also indicates the fuel savings.

Clause 37. The computer-readable storage medium of any of clauses 29 to 36, wherein the GUI is generated for display by a flight planning system for use as the flight is planned.

Clause 38. The computer-readable storage medium of clause 37, wherein the information includes an expected taxi clearance that describes the route that the aircraft is expected to be authorized to travel between the gate and the runway, and the route is plotted using the expected taxi clearance.

Clause 39. The computer-readable storage medium of clause 38, wherein the flight of the aircraft is planned for a specified day, for a specified departure or arrival time at the airport, wherein the GUI that is generated also includes a chart that represents historical taxi durations between the gate and the runway on the specified day, for a number of departure or arrival times, and wherein the information from which the recommendation is determined further includes a predicted taxi duration of the taxi operation, and the predicted taxi duration is determined for the specified departure or arrival time from the historical taxi durations.

Clause 40. The computer-readable storage medium of any of clauses 29 to 39, wherein the GUI is generated for display by an electronic flight bag (DT) for use onboard the aircraft as the flight is executed.

Clause 41. The computer-readable storage medium of clause 40, wherein the information includes a taxi clearance that describes the route that the aircraft is authorized to travel between the gate and the runway, and the route is plotted using the taxi clearance.

Clause 42. The computer-readable storage medium of clause 41, wherein GUI that is generated also specifies the taxi clearance.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for planning operation of an aircraft at an airport, the aircraft having fuel-consuming systems that include multiple engines, the apparatus comprising:
a communications device configured to communicate with the aircraft;
a memory device configured to store computer-readable program code; and
a processing circuit configured to access the memory and execute the computer-readable program code to cause the apparatus to:
access information that describes a taxi operation of the aircraft between a gate and a runway of the airport for a flight of the aircraft;
determine a recommendation for reduced-engine taxi operation of the aircraft based on the information, the recommendation dividing the reduced-engine taxi operation into steps including a reduced-engine step performed without one or more of the multiple engines running, and an all-engines step performed with all of the multiple engines running, wherein the recommendation is determined utilizing first and second machine learning (ML) models to divide the reduced-engine taxi operation into the reduced-engine and all-engine steps, wherein the first ML model is trained to produce a first prediction of fuel burn for the fuel-consuming systems for all-engine taxi operation of the aircraft, and the second ML model is trained to produce a second prediction of fuel burn for select ones of the fuel-consuming systems for reduced-engine taxi operation of the aircraft;

plot a route for the taxi operation on a diagram of the airport, between the gate and the runway;

annotate the route on the diagram with an indication of the recommendation for the taxi operation, the indication of the recommendation including indications of the steps into which the reduced-engine taxi operation is divided, the route annotated to indicate segments of the route over which the steps are performed; and generate a graphical user interface (GUI) that includes the diagram with the route and the indication of the recommendation, the GUI being displayed on a touchscreen display by which an operator of the aircraft can manipulate the annotated route.

2. The apparatus of claim 1, wherein the steps of the reduced-engine taxi operation further include a transition step between the reduced-engine step and the all-engines step, the transition step performed with the one or more of the multiple engines in a warmup or cool-down state.

3. The apparatus of claim 1, wherein the information further includes a predicted taxi duration of the taxi operation, wherein determining the recommendation includes determining durations of the steps from the predicted taxi duration, and wherein the route is annotated with the indications of the steps that includes the durations.

4. The apparatus of claim 1, wherein the route is annotated with the indications of the steps using a color-coded overlay on the route to indicate the segments of the route over which the steps are performed, and/or callouts that identify the steps and that are connected to the segments of the route.

5. The apparatus of claim 1, wherein the information further includes a predicted taxi duration of the taxi operation, wherein determining the recommendation further includes determining durations of the steps from the predicted taxi duration, and wherein the GUI that is generated also includes a bar chart that represents the steps with bars with lengths proportional to the durations of the steps and that indicates segments of the route at which the reduced-engine taxi operation transitions between the steps.

6. The apparatus of claim 1, wherein determining the recommendation further includes determining a fuel savings of the reduced-engine taxi operation from at least the reduced-engine step, and wherein the GUI that is generated also indicates the fuel savings.

7. The apparatus of claim 1, wherein the GUI is generated for display by a flight planning system for use as the flight is planned.

8. The apparatus of claim 7, wherein the information includes an expected taxi clearance that describes the route that the aircraft is expected to be authorized to travel between the gate and the runway, and the route is plotted using the expected taxi clearance.

9. The apparatus of claim 8, wherein the flight of the aircraft is planned for a specified day, for a specified departure or arrival time at the airport, wherein the GUI that is generated also includes a chart that represents historical taxi durations between the gate and the runway on the specified day, for a number of departure or arrival times, and wherein the information from which the recommendation is determined further includes a predicted taxi duration of the taxi operation, and the predicted taxi duration is determined for the specified departure or arrival time from the historical taxi durations.

10. The apparatus of claim 1, wherein the GUI is generated for display by an electronic flight bag (EFB) for use onboard the aircraft as the flight is executed.

11. The apparatus of claim 10, wherein the information includes a taxi clearance that describes the route that the aircraft is authorized to travel between the gate and the runway, and the route is plotted using the taxi clearance.

12. A method of planning operation of an aircraft at an airport, the aircraft having fuel-consuming systems that include multiple engines, the method comprising:

accessing, via a processing circuit from a memory device, information that describes a taxi operation of the aircraft between a gate and a runway of the airport for a flight of the aircraft;

determining, via the processing circuit, a recommendation for reduced-engine taxi operation of the aircraft based on the information, the recommendation dividing the reduced-engine taxi operation into steps including a reduced-engine step performed without one or more of the multiple engines running, and an all-engines step performed with all of the multiple engines running, wherein the recommendation is determined utilizing first and second machine learning (ML) models to divide the reduced-engine taxi operation into the reduced-engine step and the all-engine step, wherein the first ML model is trained to produce a first prediction of fuel burn for the fuel-consuming systems for all-engine taxi operation of the aircraft, and the second ML model is trained to produce a second prediction of fuel burn for select ones of the fuel-consuming systems for reduced-engine taxi operation;

plotting, via the processing circuit, a route for the taxi operation on a diagram of the airport, between the gate and the runway;

annotating, via the processing circuit, the route on the diagram with an indication of the recommendation for the taxi operation, the indication of the recommendation including indications of the steps into which the reduced-engine taxi operation is divided, the route annotated to indicate segments of the route over which the steps are performed; and generating, via the processing circuit, a graphical user interface (GUI) that includes the diagram with the route and the indication of the recommendation, the GUI being displayed on a touchscreen display by which an operator of the aircraft can manipulate the annotated route.

13. The method of claim 12, wherein the steps of the reduced-engine taxi operation further include a transition step between the reduced-engine step and the all-engines step, the transition step performed with the one or more of the multiple engines in a warmup or cool-down state.

14. The method of claim 12, wherein the information further includes a predicted taxi duration of the taxi operation, wherein determining the recommendation includes determining durations of the steps from the predicted taxi duration, and wherein the route is annotated with the indications of the steps that includes the durations.

15. The method of claim 12, wherein the route is annotated with the indications of the steps using a color-coded overlay on the route to indicate the segments of the route over which the steps are performed, and/or callouts that identify the steps and that are connected to the segments of the route.

16. The method of claim 12, wherein the information further includes a predicted taxi duration of the taxi operation, wherein determining the recommendation includes determining durations of the steps from the predicted taxi duration, and wherein the GUI that is generated also includes a bar chart that represents the steps with bars with lengths proportional to the durations of the steps and that indicates segments of the route at which the reduced-engine taxi operation transitions between the steps.

17. The method of claim 12, wherein determining the recommendation includes determining a fuel savings of the reduced-engine taxi operation from at least the reduced-engine step, and wherein the GUI also indicates the fuel savings.

18. The method of claim 12, wherein the GUI is generated for display by a flight planning system for use as the flight is planned.

19. The method of claim 18, wherein the information includes an expected taxi clearance that describes the route that the aircraft is expected to be authorized to travel between the gate and the runway, and the route is plotted using the expected taxi clearance.

20. The method of claim 19, wherein the flight of the aircraft is planned for a specified day, for a specified departure or arrival time at the airport, wherein the GUI that is generated also includes a chart that represents historical taxi durations between the gate and the runway on the specified day, for a number of departure or arrival times, and wherein the information from which the recommendation is determined further includes a predicted taxi duration of the taxi operation, and the predicted taxi duration is determined for the specified departure or arrival time from the historical taxi durations.

21. The method of claim 12, wherein the GUI is generated for display by an electronic flight bag (EFB) for use onboard the aircraft as the flight is executed.

22. The method of claim 21, wherein the information includes a taxi clearance that describes the route that the aircraft is authorized to travel between the gate and the runway, and the route is plotted using the taxi clearance.

* * * * *